(12) United States Patent
Watarai et al.

(10) Patent No.: US 7,516,677 B2
(45) Date of Patent: Apr. 14, 2009

(54) TORSION DETECTING SLEEVE MEMBER AND TORQUE-DETECTING DEVICE

(75) Inventors: Etsuyoshi Watarai, Osaka (JP); Noriyuki Horiuchi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/830,117

(22) Filed: Jul. 30, 2007

(65) Prior Publication Data
US 2008/0245160 A1     Oct. 9, 2008

(30) Foreign Application Priority Data
Apr. 3, 2007     (JP) .............................. 2007-097596

(51) Int. Cl.
*G01L 3/02*     (2006.01)
(52) U.S. Cl. ..................... 73/862.321; 73/862
(58) Field of Classification Search ................ 73/862.331–862.333, 862–862.37
See application file for complete search history.

(56) References Cited

U.S. PATENT DOCUMENTS

| | | | | |
|---|---|---|---|---|
| 4,796,911 A | * | 1/1989 | Kuroki et al. ............ | 280/5.511 |
| 4,817,444 A | * | 4/1989 | Yagi et al. .............. | 73/862.335 |
| 6,328,128 B1 | * | 12/2001 | Chikaraishi .................. | 180/446 |
| 6,564,653 B2 | * | 5/2003 | Desbiolles ............. | 73/862.335 |
| 6,837,116 B2 | * | 1/2005 | Desbiolles ............. | 73/862.335 |

FOREIGN PATENT DOCUMENTS

| JP | H03-269330 | 11/1991 |
|---|---|---|
| JP | 2001-289720 | 10/2001 |

* cited by examiner

*Primary Examiner*—Max Noori
(74) *Attorney, Agent, or Firm*—Global IP Counselors, LLP (57) ABSTRACT

A torque-detecting sleeve member is a cylindrical member that has first and second cylindrical torque-acting parts, a torsion signal generator and a torsion converter. Torque acts on the first and second cylindrical torque-acting parts in at least two points. The torsion signal generator is disposed axially between the first and second cylindrical torque-acting parts to at least partially form an external peripheral surface between the first and second cylindrical torque-acting parts. The torsion converter is operatively disposed between the torsion signal generator and at least one of the first and second cylindrical torque-acting parts for converting torsion transmitted from the at least one of the first and second cylindrical torque-acting parts to the torsion signal generator.

12 Claims, 10 Drawing Sheets

TORSION DETECTING SLEEVE MEMBER AND TORQUE-DETECTING DEVICE

CROSS-REFERENCE TO RELATED APPLICATIONS

This application claims priority under 35 U.S.C. § 119 to Japanese Patent Application No. 2007-097596, filed Apr. 3, 2007. The entire disclosure of Japanese Patent Application No. 2007-097596 is hereby incorporated herein by reference.

BACKGROUND OF THE INVENTION

1. Field of the Invention

This invention generally relates to a cylindrical torsion-detecting sleeve member. More specifically, the present invention relates to a torque-detecting device that uses the sleeve member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycles have been provided with cycle computers to inform the rider of various traveling conditions of the bicycle.

Bicycles are sometimes equipped with a torque sensor (e.g., a torque-detecting device) for detecting torque acting on an axle. One example of a torque sensor that is being developed uses magnetostrictive effects wherein magnetic force varies according to strain (see Japanese Laid-Open Patent Application Nos. 3-269330 and 2001-289720, for example).

The torque sensor disclosed in Japanese Laid-Open Patent Application No. 3-269330 has two solid shafts disposed concentrically, a thin cylindrical shaft connected in series between the two solid shafts, and a detection coil disposed on the external periphery of the thin cylindrical shaft. The thin cylindrical shaft has an effective surface area that is sufficiently smaller than that of the two solid shafts, and the solid shafts are magnetized in one direction along an axial core line. Magnetostrictive elements are affixed to the external peripheral surface of the thin cylindrical shaft. Two magnetostrictive elements are used, and these elements have uniaxial magnetic anisotropy so that their easy magnetization axes intersect. Disposing the magnetostrictive elements on the thin cylindrical shafts in this manner makes it possible to increase the amount of strain created in the magnetostrictive elements and to increase the sensitivity of detection even in cases in which the rotational torque is small.

In Japanese Laid-Open Patent Application No. 3-269330, the torque sensor is disclosed as detecting torque by using a thin cylindrical shaft. Therefore, the torsion is excessive when a comparatively large amount of torque is detected in the bicycle or the like. Also the sensitivity of detection may be reduced, leading to large measurement errors.

In Japanese Laid-Open Patent Application No. 2001-289720, the torque sensor is disclosed as having a sleeve with a magnetostrictive pattern formed in the external peripheral surface by inclining magnetostrictive members towards the core, a torque transmission shaft that fits into the internal peripheral surface of the sleeve, and a detection coil disposed on the external periphery of the sleeve. Concavities and convexities are formed in the external peripheral surface of the torque transmission shaft, and a hollow part is formed in the internal periphery. The sleeve is plastically bonded to the torque transmission shaft by expanding the diameter of the hollow part.

In the configuration of Japanese Laid-Open Patent Application No. 2001-289720, when a comparatively large amount of torque is detected and the stress acting on the torque transmission shaft exceeds a specified level, the residual stress in the interior of the torque transmission shaft may result in hysteresis, errors in sensor output, and measurement errors.

Thus, in the configurations of the conventional examples, measurement errors may occur when a large amount of torque is applied. Moreover, the range of torque detection is limited by the thickness or rigidity of the thin cylindrical member or the sleeve even when the amount of torque is small, and it is difficult to vary the range of torque detection.

In view of the above, it will be apparent to those skilled in the art from this disclosure that there exists a need for an improved torsion-detecting sleeve member. This invention addresses this need in the art as well as other needs, which will become apparent to those skilled in the art from this disclosure.

SUMMARY OF THE INVENTION

One object of the present invention is to provide a cylindrical torsion-detecting sleeve member and a torque sensor wherein the range of torque detection can be varied in relation to the applied torque.

Another object of the present invention is to provide a cylindrical torsion-detecting sleeve member and a torque sensor wherein measurement errors can be prevented even when a large amount of torque is applied.

A cylindrical torsion-detecting sleeve member is provided according to a first aspect that basically includes a first cylindrical torque-acting part, a second cylindrical torque-acting part, a torsion signal generator and a torsion converter. The first cylindrical torque-acting part is disposed at a first location. The second cylindrical torque-acting part is disposed at a second location that is axial spaced from the first location. The torsion signal generator is disposed axially between the first and second cylindrical torque-acting parts to at least partially form an external peripheral surface between the first and second cylindrical torque-acting parts. The torsion converter is operatively disposed between the torsion signal generator and at least one of the first and second cylindrical torque-acting parts for converting torsion transmitted from the at least one of the first and second cylindrical torque-acting parts to the torsion signal generator.

In cases in which torque is detected by this cylindrical torsion-detecting sleeve member, the cylindrical torque-acting parts are fastened to a rotating shaft or another such shaft member to which torque is applied, and the torque is applied in at least two points. When torque is applied to the cylindrical torque-acting parts, the sleeve member twists at least between the two points, and the torsion signal generator provided to at least part of the external peripheral surface between the first and second cylindrical torque-acting parts generates a torsion signal. The torque applied to the shaft member can be detected by using, e.g., coils to detect the generated torsion signal. Since a torsion converter is provided between the torsion signal generator and at least one of the cylindrical torque-acting parts, the torsion can be converted, wherein the torsion of the sleeve member corresponding to the applied torque is increased or reduced. Since a torsion converter is provided between the torsion signal generator and at least one of the first and second cylindrical torque-acting parts, the torsion converter can vary the torsion of the sleeve member even when torque acts on the at least one of the first and second cylindrical torque-acting parts. Therefore, the range of torque detection can be varied in relation to the applied torque.

The torsion-detecting sleeve member according to a second aspect is the torsion-detecting sleeve member according to the first aspect, wherein the torsion converter is operatively arranged to reduce an amount of the torsion transmitted from the at least one of the first and second cylindrical torque-acting parts to the torsion signal generator. In this case, less torsion is transmitted from the first and second cylindrical torque-acting parts to the torsion signal generator. Therefore, the torsion signal generator is not likely to twist excessively, and measurement errors can be prevented even when a large amount of torque is applied.

The torsion-detecting sleeve member according to a third aspect is the torsion-detecting sleeve member according to the first or second aspect, wherein the torsion converter includes first and second torsion converter parts bonded to both ends of the torsion signal generator. In this case, the torsion can be varied in large amounts because first and second torsion-varying parts are disposed separately between the torsion signal generator and at least two torque-acting parts.

The torsion-detecting sleeve member according to a fourth aspect is the torsion-detecting sleeve member according to any one of the first through third aspects, wherein the torsion converter includes a plurality of through-holes arranged in a circumferentially direction. In this case, the through-holes can reduce the torsional rigidity of the sleeve member to allow the sleeve member to twist easily, some or all of the through-holes can be closed off to increase torsional rigidity to inhibit twisting, and the torsion transmitted from the first and second cylindrical torque-acting parts can be easily varied.

The torsion-detecting sleeve member according to a fifth aspect is the torsion-detecting sleeve member according to the fourth aspect, wherein the through-holes are oval holes extending in an axial direction. In this case, since the through-holes extend in the axial direction, the torsion converter easily in large amounts when torque is applied, and the torsion can be easily varied in large amounts.

The torsion-detecting sleeve according to a sixth aspect is the torsion-detecting sleeve member according to any one of the first through fifth aspects, wherein the torsion signal generator includes a plurality of belt-shaped magnetostrictive members having intersecting easy magnetization axes. In this case, since the torsion signal generator includes belt-shaped magnetostrictive members having intersecting easy magnetization axes, variation in the permeability of the magnetostrictive members caused by twisting can be precisely detected by detecting the variation in the impedance or in the induced voltage of coils or other such detection elements, and the torque can be easily detected without contact.

A torque-detecting device according to a seventh aspect is provided that includes the torsion-detecting sleeve member according to any one of the first through sixth aspects. The torque-detecting device further comprises a torque transmission shaft, a torsion signal detector, and a rotational torque output unit. The torque transmission shaft is affixed to the torsion-detecting sleeve member at the first and second cylindrical torque-acting parts for transmitting rotational torque from the torque transmission shaft to the torsion-detecting sleeve member. The torsion signal detector is disposed on an exterior of the torsion signal generator of the torsion-detecting sleeve member for detecting torsion signals from the torsion signal generator. The rotational torque output unit is configured to calculate and output the rotational torque applied to the torque transmission shaft based on detection signals detected from the torsion signal detector.

In the torque-detecting device, when the torque transmission shaft rotates to create torque and cause twisting, for example, the twisting is transmitted to the torsion-detecting sleeve member in the first and second cylindrical torque-acting parts. When the torsion is transmitted to the sleeve member, the sleeve member twists between at least two points, and the torsion signal generator provided to at least part of the external peripheral surface between the first and second cylindrical torque-acting parts generates a torsion signal. This generated torsion signal is detected by the torsion signal detector, and the rotational torque output unit calculates and outputs the rotational torque applied to the torque transmission shaft on the basis of the detected torsion signal. Since the torsion converter is provided between the torsion signal generator and at least one of the first and second cylindrical torque-acting parts, the torsion can be converted, wherein the torsion of the sleeve member corresponding to the applied torque is increased or reduced. Since the torsion converter is provided between the torsion signal generator and at least one of the first and second cylindrical torque-acting parts, the torsion converter can vary the torsion in the sleeve member even when the torque acts on the first and second cylindrical torque-acting parts. Therefore, the range of torque detection can be varied in relation to the applied torque.

The torque-detecting device according to an eighth aspect is the torque-detecting device according to any of the seventh aspect, wherein the torque transmission shaft is crank axle that is configured to be received inside a bottom bracket. In the torque-detecting device, when the crank axle rotates to create torque and cause twisting, for example, the twisting is transmitted to the torsion-detecting sleeve member in the first and second cylindrical torque-acting parts. When the torsion is transmitted to the sleeve member, the sleeve member twists between the two torque-acting parts, and the torsion signal generator provided to at least part of the external peripheral surface between the first and second cylindrical torque-acting parts generates a torsion signal. This generated torsion signal is detected by the torsion signal detector, and the rotational torque output unit calculates and outputs the rotational torque applied to the crank axle on the basis of the detected torsion signal. Since the torsion converter is provided between the torsion signal generator and at least one of the first and second cylindrical torque-acting parts, the torsion can be converted, wherein the torsion of the sleeve member corresponding to the applied torque is increased or reduced. Since the torsion converter is provided between the torsion signal generator and the two torque-acting parts, the torsion converter can vary the torsion in the sleeve member even when the torque acts on the first and second cylindrical torque-acting parts. Therefore, the range of torque detection can be varied in relation to the applied torque.

The torque-detecting device according to a ninth aspect is the torque-detecting device according to the eighth aspect, wherein the first and second cylindrical torque-acting parts are press-fitted onto the crank axle. In this case, since the two torque-acting parts are not affixed directly to the crank axle, but instead are fastened to the crank axle via first and second press-fitted members that are separately press-fitted to the crank axle, the first and second press-fitted members readily twist as does the sleeve member when the crank axle twists. Therefore, detection sensitivity is improved.

The torque-detecting device according to a tenth aspect is the torque-detecting device according to any one of the seventh through ninth aspects, wherein the torsion signal generator includes a plurality of belt-shaped magnetostrictive members having intersecting easy magnetization axes, and the torsion signal detector is a coil arranged to detect magnetic strain in the magnetostrictive members. In this case, since the torsion signal detector includes belt-shaped magnetostrictive members having intersecting easy magnetization axes, variation in the permeability of the magnetostrictive members caused by twisting can be precisely detected by detecting the variation in the impedance or in the induced voltage of the coil, and the torque can be easily detected without contact.

According to the present invention, since the torsion converter is provided between the torsion signal generator and at least one of the first and second cylindrical torque-acting parts, the torsion converter can vary the torsion of the sleeve member even when torque acts on the first and second cylindrical torque-acting parts. Therefore, the range of torque detection can be varied in relation to the applied torque.

According to another aspect of the present invention, the amount of torsion transmitted from the first and second cylindrical torque-acting parts to the torsion signal generator is reduced. Therefore, the torsion signal generator is not likely to twist excessively, and errors in measurement can be prevented even when a large amount of torque is applied.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
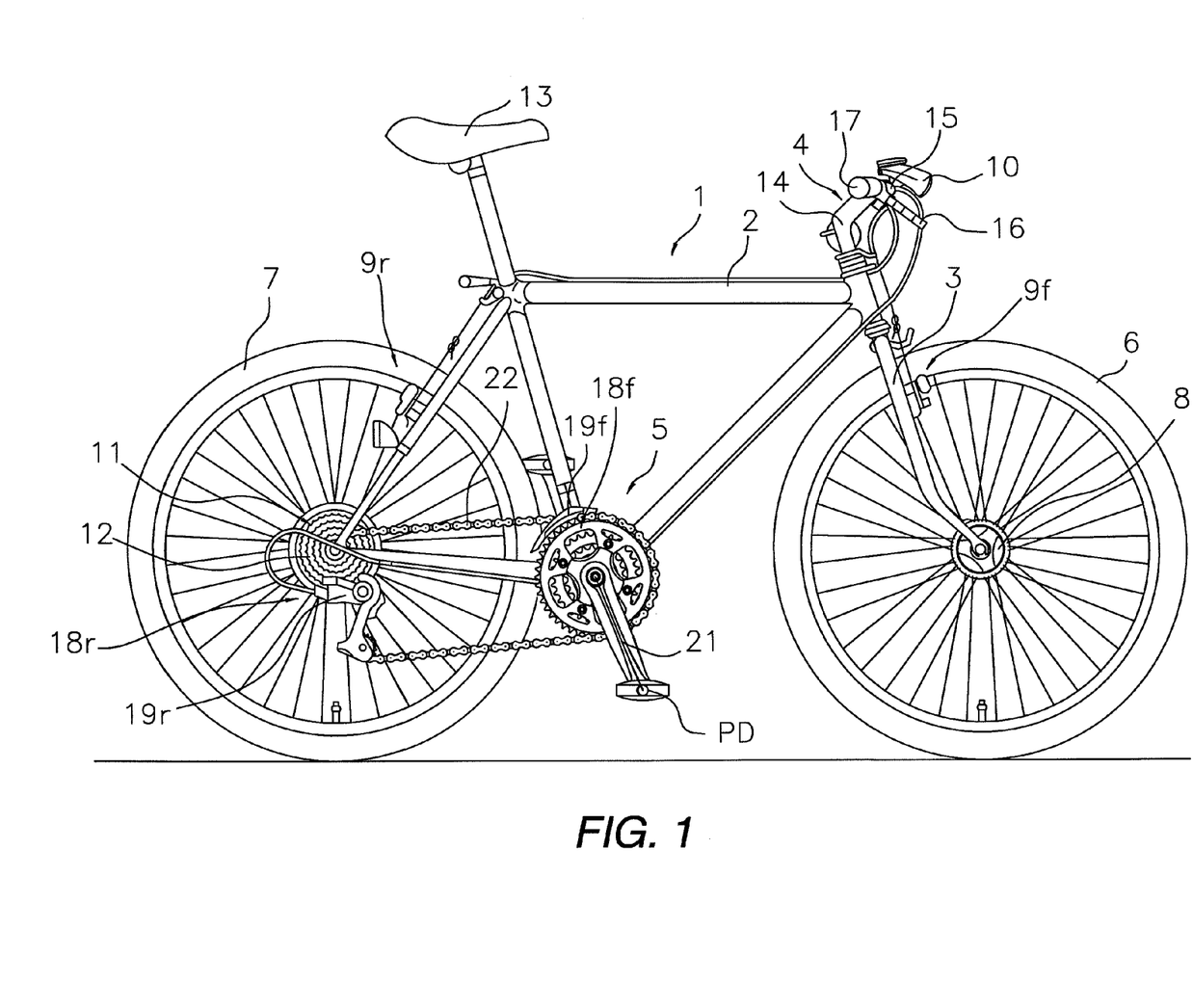
FIG. 1 is a side elevational view of a bicycle equipped with a torque sensor in accordance with a first embodiment of the present invention.

Referring initially to FIG. 1, a bicycle is illustrated in accordance with a first embodiment of the present invention. In FIG. 1, the bicycle is a mountain bike that is particularly suitable for off-road use. The bicycle includes a frame 1 having a diamond-shaped frame body 2 and a front fork 3, a handle unit 4, a drive unit 5, a front wheel 6 with a hub dynamo 8, a rear wheel 7 and a pair of brake devices 9$f$ and 9$r$. A front light 10 equipped with a cycle computer is mounted on the handle unit 4 for illuminating the area in front of the bicycle and providing information to the rider.

The frame body 2 of the frame 1 is made by welding pipes together. Various components including a saddle 13 and the drive unit 5 are attached to the frame body 2. The front fork 3 is mounted to be capable of pivoting around an axle that is inclined relative to the front of the frame body 2.

The handle unit 4 has a handle stem 14 and a handlebar 15. The handle stem 14 is fixed to the top of the front fork 3. The handlebar 15 is fixed to the handle stem 14. Brake levers 16 and grips 17 are mounted at either end of the handlebar 15 for operating the front and rear brake devices 9$f$ and 9$r$. The left and right brake levers 16 are integrally or separately provided with shifting levers (not shown) for shifting gears with external shifting devices 18$f$ and 18$r$ (described later).

The drive unit 5 has a crank assembly 21, a chain 22 and the front and rear external shifting devices 18$f$ and 18$r$. The crank assembly 21 is provided to a hanger part 20 (FIG. 2) at the bottom of the frame body 2. The chain 22 runs over the crank assembly 21. The front and rear external shifting devices 18$f$, 18$r$ have a front derailleur 19$f$ and a rear derailleur 19$r$ mounted in the middle and rear of the frame 1, respectively. The front derailleur 19$f$ guides the chain 22 onto any of a plurality of sprockets 35 to 37 (e.g., three) provided to a gear crank 24. The rear derailleur 19$r$ guides the chain 22 onto any of a plurality of sprockets 12 (e.g., eight) of a small gear part 11 mounted on the hub axle of the rear wheel 7.

Figure 2:
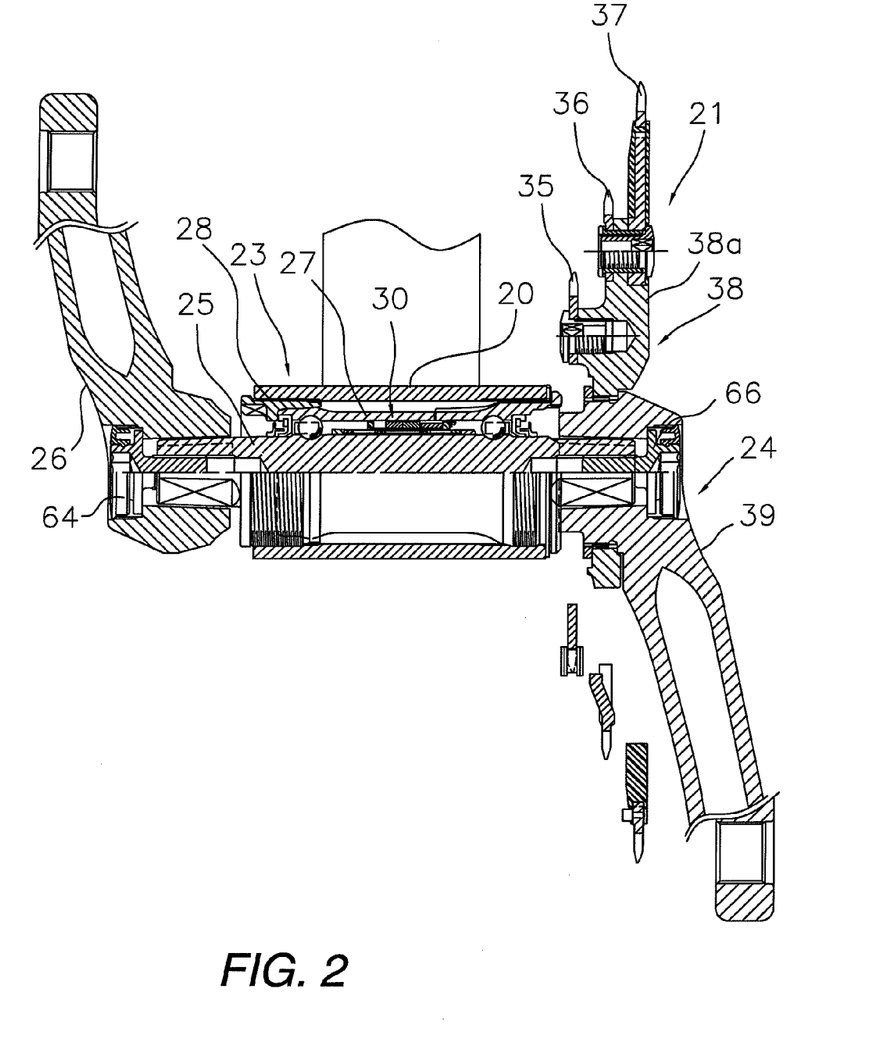
FIG. 2 is a partial cross-sectional view of a crank assembly equipped with the torque sensor in accordance with a first embodiment.

The crank assembly 21 has a crank axle assembly 23 having a crank axle 25 (an example of a torque transmission shaft), a gear crank 24 detachably fixed to the right end of the crank axle 25, and a left crank 26 detachably fixed to the left end of the crank axle 25, as shown in FIG. 2.

The gear crank 24 has, e.g., three sprockets 35 to 37, a sprocket attachment part 38 and a right crank 39. The sprockets 35 to 37 are disposed in alignment in the axial direction so that the number of teeth increases outward in the axial direction. The sprocket attachment part 38 has a plurality of arm parts 38$a$ (e.g., four) extending in a radial pattern to fasten the three sprockets 35 to 37 in place. The right crank 39 has a proximal end that is fastened to the center of the sprocket attachment part 38, as shown in FIG. 2. The proximal end of the right crank 39 is integrally and rotatably linked to the right end of the crank axle 25, with a pedal PD is mounted on the distal end. The left crank 26 is integrally and rotatably linked at the proximal end to the left end of the crank axle 25, with a pedal PD can be mounted on the distal end. The gear crank 24 and the left crank 26 are fastened to the crank axle 25 by fastening bolts 66 and 64.

Figure 3:
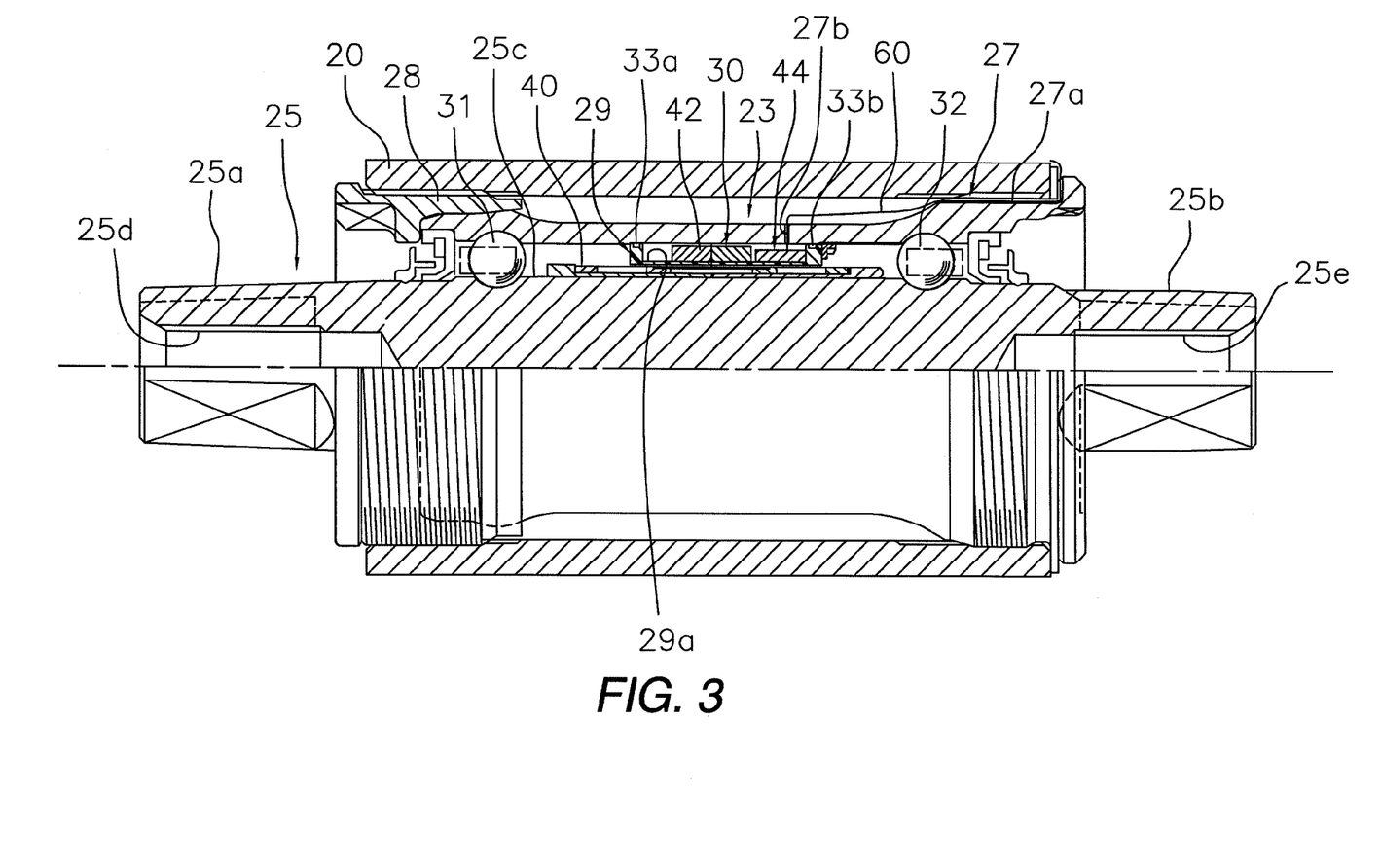
FIG. 3 is an enlarged partial cross-sectional view of the crank axle assembly with the torque sensor in accordance with the first embodiment.

The crank axle assembly 23 has a first adapter 27, a second adapter 28 and a torque sensor 30. The first adapter 27 is a cylindrical member that is threaded in from the right end of the hanger part 20. The second adapter 28 is a cylindrical member that is threaded in from the left end. The crank axle 25 is rotatably supported on the first adapter 27. The torque sensor 30 (e.g., a torque-detecting device) is configured and arranged for detecting torque that acts on the crank axle 25, as shown in FIG. 3.

The first and second adapters 27 and 28 are ridged cylindrical members threaded and fastened separately from both ends of the hanger part 20 as previously described. A wire insertion groove 27a is formed in the axial direction of the external peripheral surface of a threaded portion of the first adapter 27 for leading a signal wire 60 (described later) to the outside of the first adapter 27. A leading hole 27b is formed in the radial direction through a cylindrical portion of the first adapter 27 for drawing out a signal wire.

Figure 6:
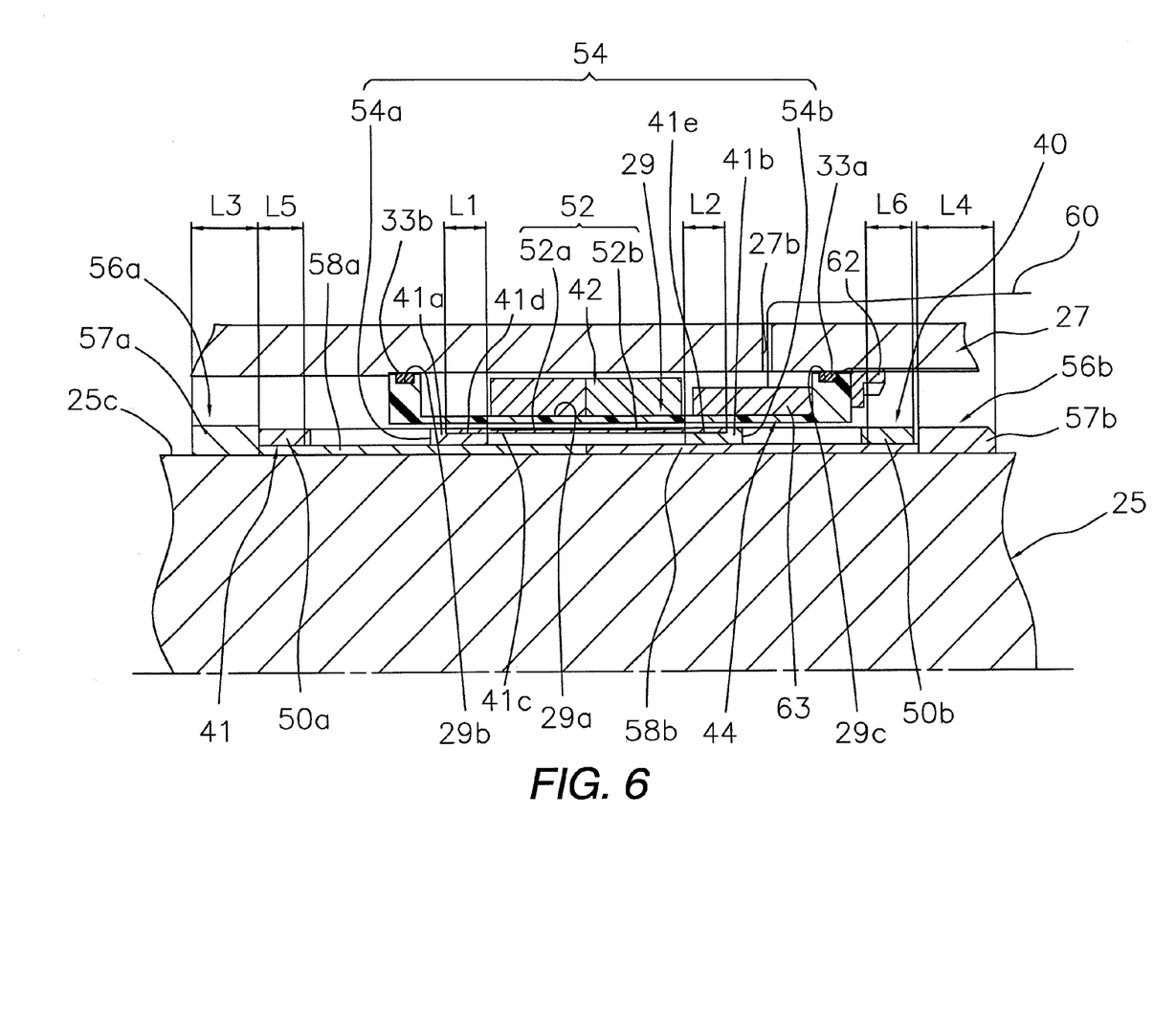
FIG. 6 is an enlarged, partial cross-sectional view of a crank axle with the sleeve member installed thereon.

A mounting member 29 is mounted on the internal peripheral surface of the first adapter 27. The mounting member 29 is preferably made of a synthetic resin, for example. The mounting member 29 is fastened to the first adapter 27 using a threaded member 62 that screws into the internal peripheral surface of the first adapter 27, as shown in FIG. 6. A cylindrical mounting concavity 29a is formed in the external peripheral surface in the middle of the mounting member 29. Circular grooves 29b and 29c in which O rings 33a and 33b are mounted are disposed in the external peripheral surface that faces the internal peripheral surface of the first adapter 27 at both ends of the mounting member 29. These O rings 33a and 33b make it possible to prevent grease and other such contaminants from infiltrating the interior of the mounting member 29.

The first adapter 27 and the crank axle 25 are rotatably supported by a pair of bearings 31 and 32. The bearings 31 and 32 are disposed at intervals between the first adapter 27 and the crank axle 25. The first adapter 27 functions as an outer wheel of the bearings 31 and 32, while the crank axle 25 functions as an inner wheel. The second adapter 28 interlocks with the left end of the first adapter 27. Thus, the second adapter 28 is fastened to the hanger part 20 together with the first adapter 27.

The crank axle 25 is a solid rod-shaped member that is rotatably mounted via the first adapter 27 to the hanger part 20 via the bearings 31 and 32. The crank axle 25 includes a pair of crank mounting parts 25a and 25b. The crank mounting parts 25a and 25b have tapered surfaces on which the left crank 26 and the gear crank 24 are integrally mounted. The axial center portion of the crank axle 25 has a press-fitting surface 25c formed thereon. The fitting surface 25c is larger in diameter than the axial outer sides of the crank axle 25. Furthermore, the crank axle 25 includes thread holes 25d and 25e formed in both end surfaces. The thread holes 25d and 25e threadedly receive the fastening bolts 64 and 66.

The torque sensor 30 includes a torsion-detecting sleeve member 40 attached to the crank axle 25, a torsion signal detector 42, and a rotational torque output unit 44, as shown in FIG. 3. The torsion signal detector 42 and the rotational torque output unit 44 are mounted on the mounting member 29.

Figure 4:
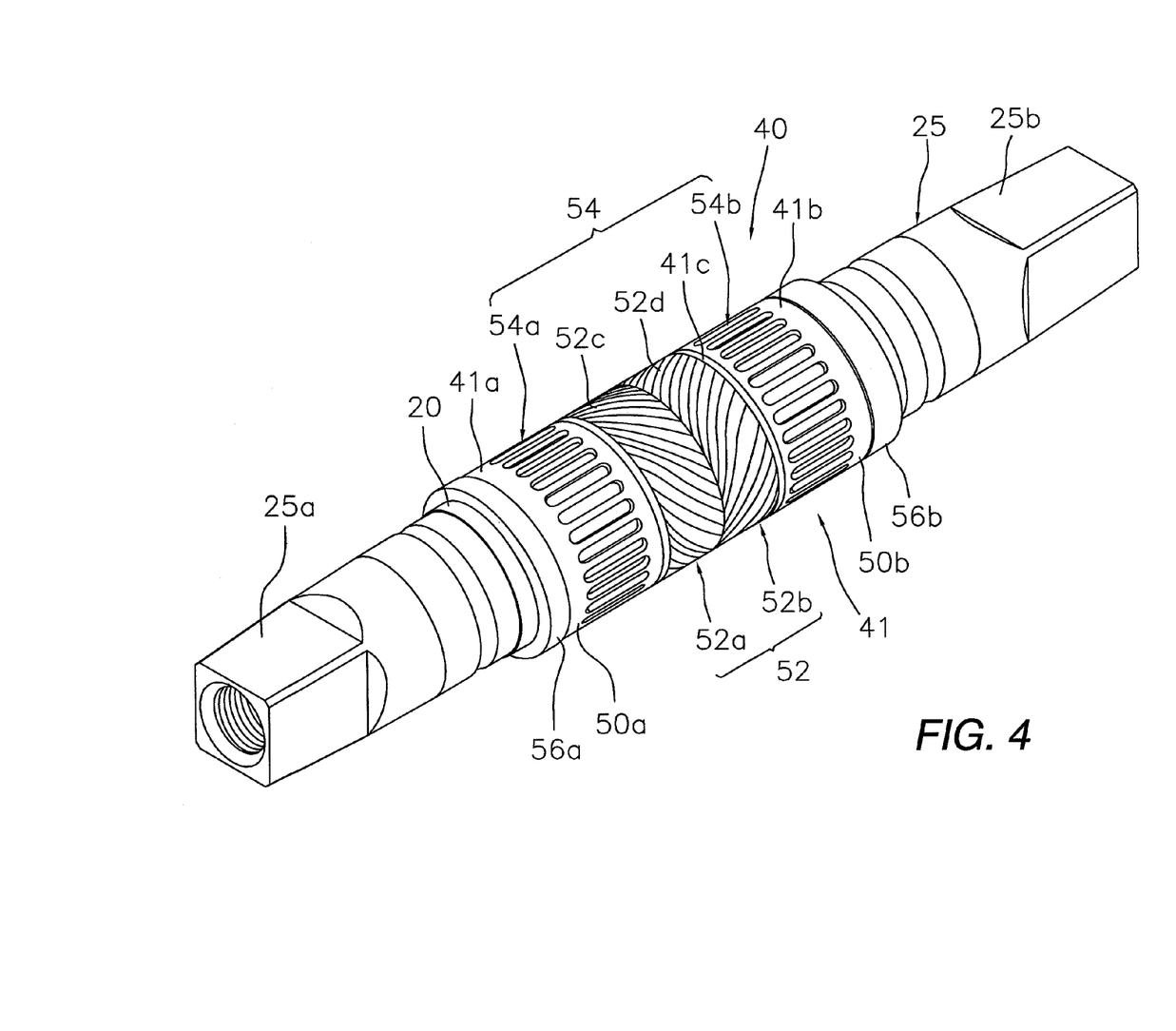
FIG. 4 is a perspective view of a crank axle to which the sleeve member is fastened in accordance with the first embodiment.
Figure 5:
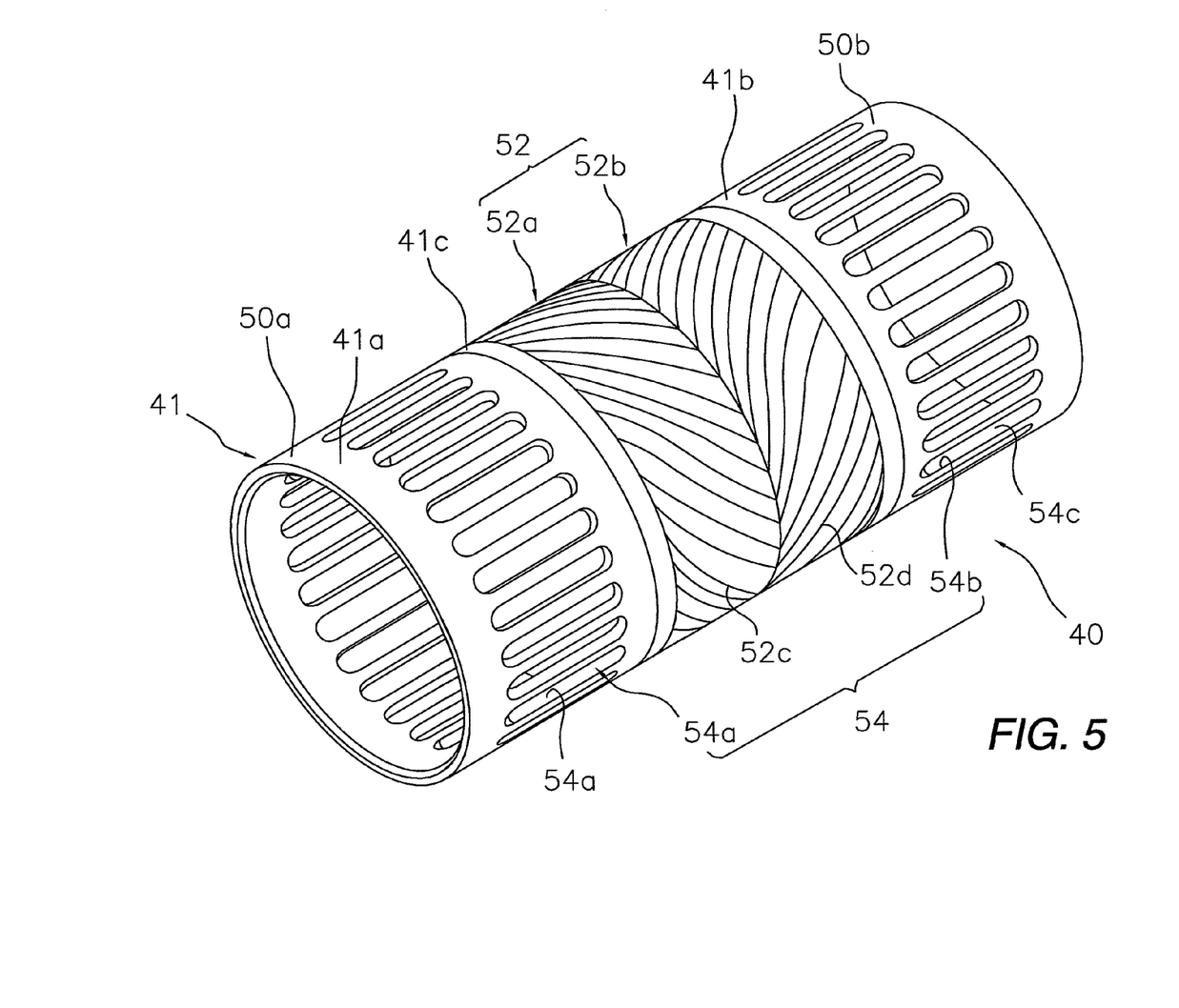
FIG. 5 is a perspective view of the sleeve member in accordance with the first embodiment.

As seen in FIGS. 4 to 6, the sleeve member 40 has a cylindrical sleeve main body 41 that is configured with first and second cylindrical members 41a and 41b and a third cylindrical member 41c. The first and second cylindrical members 41a and 41b are made of, e.g., a comparatively rigid metal such as SK5 or any other suitable carbon tool steels. The third cylindrical member 41c is made of, e.g., SUS 304 or any other suitable nonmagnetic metals. The third cylindrical member 41c is disposed between the first and second cylindrical members 41a and 41b, as shown in FIG. 6. The third cylindrical member 41c is a cylindrical member that is thinner than the first and second cylindrical members 41a and 41b. Both ends of the third cylindrical member 41c are bonded to or otherwise fastened to recessed parts 41d and 41e formed in the external peripheral surfaces of the axial interiors of the first and second cylindrical members 41a and 41b. The recessed parts 41d and 41e have first and second lengths L1 and L2 along the axial direction of the first and second cylindrical members 41a and 41b, and the ends of the third cylindrical member 41c are bonded over the entire surfaces of the lengths L1 and L2 of the recessed parts 41d and 41e.

The sleeve member 40 also includes first and second cylindrical torque-acting parts 50a and 50b, a torsion signal generator 52, and a torsion converter 54. The first and second cylindrical torque-acting parts 50a and 50b are disposed at first and second locations that are axial spaced along the sleeve member 40. The torsion signal generator 52 is at least partially disposed on the external peripheral surface of the third cylindrical member 41c between the first and second cylindrical torque-acting parts 50a and 50b. The torsion converter 54 is disposed between the first and second cylindrical torque-acting parts 50a and 50b and the torsion signal generator 52 for converting the torsion transmitted from the first and second cylindrical torque-acting parts 50a and 50b to the torsion signal generator 52, as shown in FIGS. 4 through 6.

In the first embodiment, the first and second cylindrical torque-acting parts 50a and 50b and the torsion converter 54 are disposed on the first and second cylindrical members 41a and 41b, respectively, and the torsion signal generator 52 is disposed on the third cylindrical member 41c. The first and second cylindrical torque-acting parts 50a and 50b are provided separately to the ends of the sleeve member 40, i.e., to two locations at the axially outward ends of the first and second cylindrical members 41a and 41b. The first and second cylindrical torque-acting parts 50a and 50b are fastened separately to cylindrical first and second press-fitted members 56a and 56b, which are fastened to the crank axle 25 by being press fitted from both end sides, as shown in FIG. 6. Specifically, the first and second press-fitted members 56a and 56b have separate first and second ridges 57a and 57b of large diameter, and first and second mounting cylinders 58a and 58b of small diameter. The first and second ridges 57a and 57b are positioned on the axial outer sides, and the first and second mounting cylinders 58a and 58b are positioned on the axial inner sides of the first and second ridges 57a and 57b, respectively. The first and second press-fitted members 56a and 56b are fastened by being press-fitted to the press-fitting surface 25c of the crank axle 25 over the comparatively narrow range of the third and fourth axial lengths L3 and L4 of the first and second ridges 57a and 57b. The first and second mounting cylinders 58a and 58b are disposed with their axial inner side distal ends in contact with each other. Therefore, when torque causes the crank axle 25 to twist, the first and second press-fitted members 56a and 56b rotate easily in the twisting direction with respect to each other. The press-fitting surface 25c of the crank axle 25 is formed to have the largest diameter of any part of the crank axle 25 as previously described, and the first and second press-fitted members 56a and 56b can be press fitted onto the press-fitting surface 25c from the axial outer sides. The method of fastening the first and second press-fitted members 56a and 56b is not limited to press fitting, and serration bonding, adhesion, welding, or another suitable fastening method can be used.

The first and second cylindrical torque-acting parts 50a and 50b are bonded or otherwise fastened to the first and second mounting cylinders 58a and 58b of the first and second press-fitted members 56a and 56b. The connections between the first and second cylindrical torque-acting parts 50a and 50b and the mounting cylinders 58a and 58b extend over the comparatively narrow ranges of the fifth and sixth lengths L5 and L6 that run in the axial direction of the external peripheral surface. The connections between the first and second cylindrical torque-acting parts 50a and 50b and the mounting cylinders 58a and 58b are in proximity to the first and second ridges 57a and 57b of the first and second mounting cylinders 58a and 58b of the first and second press-fitted members 56a and 56b.

The third and fourth lengths L3 and L4, which are the lengths over which the first and second press-fitted members 56a and 56b are press fitted, are greater than the fifth and sixth lengths, which are the lengths over which the sleeve member 40 is bonded. The third and fourth lengths L3 and L4 are greater than the first and second lengths L1 and L2, which are the lengths over which the third cylindrical member 41c is bonded to the first and second cylindrical members 41a and 41b, respectively.

The torsion signal generator 52 has a plurality (e.g. two) of belt-shaped magnetostrictive members 52a and 52b bonded or otherwise suitably affixed to the external peripheral surface of the third cylindrical member 41c. The magnetostrictive members 52a and 52b have separate easy magnetization axes 52c and 52d. The magnetostrictive members 52a and 52b have magnetostrictive effects wherein the magnetic force greatly varies according to the strain caused by torsion. The easy magnetization axes 52c and 52d are made of, e.g., amorphous magnetic metallic foil, and that cross at an angle of, e.g., 90 degrees. Specifically, the easy magnetization axes 52c and 52d are both oriented in different directions at 45 degrees in relation to the axial direction. In FIGS. 4 and 5, the easy magnetization axes 52c and 52d are depicted as curved, but these axes are linear in a plan view.

When the crank axle 25 twists due to torque, tensile stress or compressive stress acts on the magnetostrictive members 52a and 52b, one of the magnetostrictive members 52a and 52b increases in permeability, and the other decreases in permeability. The torsion signal detector 42 detects the amount of torsion according to this change in permeability.

The torsion converter 54 has first and second torsion converter parts 54a and 54b bonded to the ends of the torsion signal generator 52 in the first and second cylindrical members 41a and 41b. The first and second torsion converter parts 54a and 54b both have a plurality of through-holes 54c provided at intervals around the circumference. In this embodiment, these through-holes 54c are oval holes extending in the axial direction of the first and second cylindrical members 41a and 41b. Since the torsion converter 54 is configured from through-holes 54c, torsion rigidity is low in this portion, less torsion is transmitted from the first and second cylindrical torque-acting parts 50a and 50b to the torsion signal generator 52, and the torsion signal generator 52 does not twist excessively even when a large amount of torque is generated in the crank axle 25.

The torsion signal detector 42 is disposed around the torsion signal generator 52 of the sleeve member 40, and detects torsion signals. The torsion signal detector 42 is fastened to the mounting member 29 mounted on the internal peripheral surface of the first adapter 27. The torsion signal detector 42 is disposed at a position facing the torsion signal generator 52. The torsion signal detector 42 is configured from, e.g., a pair of coils 42a and 42b for separately detecting the magnetic strain of the magnetostrictive members 52a and 52b, and the internal peripheries of the coils 42a and 42b are disposed to allow a slight gap from the torsion signal generator 52 across the mounting concavity 29a. The torsion signal detector 42 detects torsion signals corresponding to the torque from impedance variation or induced voltage variation in the coils 42a and 42b along with permeability variation in the magnetostrictive members 52a and 52b caused by torsion.

The rotational torque output unit 44 calculates and outputs rotational torque applied to the crank axle 25 on the basis of the torsion signal detected by the torsion signal detector 42. The rotational torque output unit 44 is mounted on the mounting member 29 and is configured from an output circuit 63 having a circuit board that is curved in an arc shape. The output circuit 63 has a transmitter for transmitting AC voltage having a specific frequency and amplitude, a differential amplifier for outputting rotational torque signals on the basis of the input of positive and negative signals, and resistance and rectifier circuits and a filter disposed separately in this sequence between both ends of the transmitter and the two terminals of the differential amplifier. The ends of one side of the coils 42a and 42b are grounded between the resistance and rectifier circuits, while the ends on the other side are connected. The signal wire 60 is connected to the output terminal of the differential amplifier of the output circuit 63. The signal wire 60 is led to the outside of the crank shaft assembly 23 through the leading hole 27b in the first adapter 27. The signal wire 60 is further led to the outside of the hanger part 20 via the wire insertion groove 27a provided in the first adapter 27.

In the torque sensor 30 configured in this manner, when the pedals PD are cranked and the crank axle 25 rotates relative to the hanger part 20, torque acts on the crank axle 25 in accordance with the load. When the crank axle 25 twists in response thereto, torsion is created between the first and second cylindrical torque-acting parts 50a and 50b via the first and second press-fitted members 56a and 56b. The resulting torsion decreases in the first and second torsion converter parts 54a and 54b rather than being transmitted unaltered. The reduced torsion is then transmitted to both ends of the torsion signal generator 52, because the rigidity of the first and second torsion converter parts 54a and 54b is low. Tensile stress is thereupon created in one of the two magnetostrictive members 52a and 52b while compressive stress is created in the other, creating strain in the magnetostrictive members 52a and 52b. This strain causes the permeability to vary, and this variation causes the differential amplifier to output a DC voltage torque signal corresponding to the variation in impedance of the coils 42a and 42b of the torsion signal detector 42. The outputted torque signal is inputted via the signal wire 60 to, e.g., a gear shifting control device or another such external device provided to the exterior of the hanger part 20.

In the torque sensor 30 configured in this manner, since the torsion converter 54 is provided between the torsion signal generator 52 and the first and second cylindrical torque-acting parts 50a and 50b of the sleeve member 40, the torsion converter 54 can vary the torsion of the sleeve member 40 even when torque acts on the first and second cylindrical torque-acting parts 50a and 50b. Therefore, the range of torque detection can be varied in relation to the torque acting on the crank axle 25.

The torsion transmitted from the first and second cylindrical torque-acting parts 50a and 50b to the torsion signal generator 52 is also reduced. Therefore, the torsion signal generator 52 is not likely to twist excessively, and errors in measurement can be prevented even when a large amount of torque is applied.

Second Embodiment

Referring now to FIGS. 7 to 10, a modified crank assembly 121 will now be explained in accordance with a second embodiment. The modified crank assembly 121 is installed into the hanger part 20. In view of the similarity between the first and second embodiments, the descriptions of the parts of the second embodiment that are identical to the parts of the first embodiment may be omitted for the sake of brevity.

Figure 7:
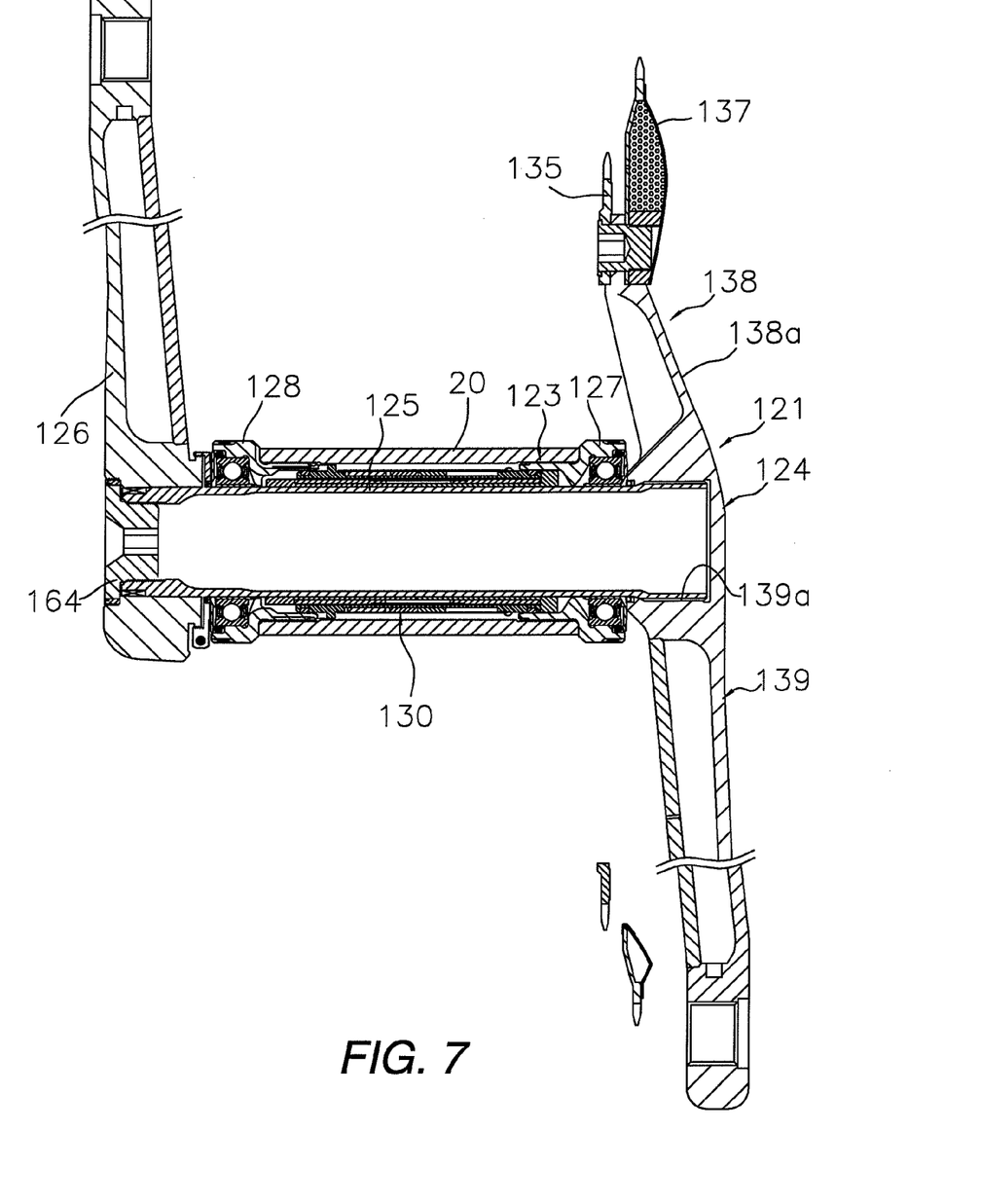
FIG. 7 is a cross-sectional view, similar to FIG. 2, of a crank assembly equipped with the torque sensor in accordance with a second embodiment.

In the first embodiment, the present invention described using the crank assembly 21 as an example, wherein the gear crank 24 and the left crank 26 were detachably fastened to both ends of the solid crank axle 25 with the aid of the fastening bolts 66 and 64. In the second embodiment, an embodiment is described in which the crank assembly 121 has a crank shaft assembly 123 with a gear crank 124 integrally fastened to one end of a crank axle 125, as shown in FIG. 7. The crank axle 125 is also integrally fastened to a left crank 126. In particular, the gear crank 124 is integrally fastened by, e.g., crimping the gear crank 124 onto the right end of the crank axle 125. The left crank 126 is detachably fastened to the left end of the crank axle 125 by a fastening bolt 164.

The gear crank 124 is provided with two sprockets 135 and 137, for example, that are aligned in the axial direction with the number of teeth increasing in an axially outward direction with respect to the center plane of the frame 1. The gear crank 124 has a sprocket attachment part 138 and a right crank part 139 that is integrally formed as a one-piece, unitary member with the sprocket attachment part 138. The sprocket attachment part 138 has a plurality (e.g., five) of arm parts 138a extending in a radial pattern for fixing the two sprockets 135 and 137. The right crank part 139 with a mounting hole 139a formed at the proximal end near a center of the sprocket attachment part 138 and a distal end with a threaded hole for mounting one of the pedals PD. The right end of the crank axle 125 is fastened to the gear crank 124 by crimping the gear crank 124 on to the right end of the crank axle 125. The proximal end of the left crank 126 is integrally and rotatably linked to the right end of the crank axle 125 by a fastening bolt 164. The distal end the left crank 126 has a threaded hole for mounting one of the pedals PD.

Figure 8:
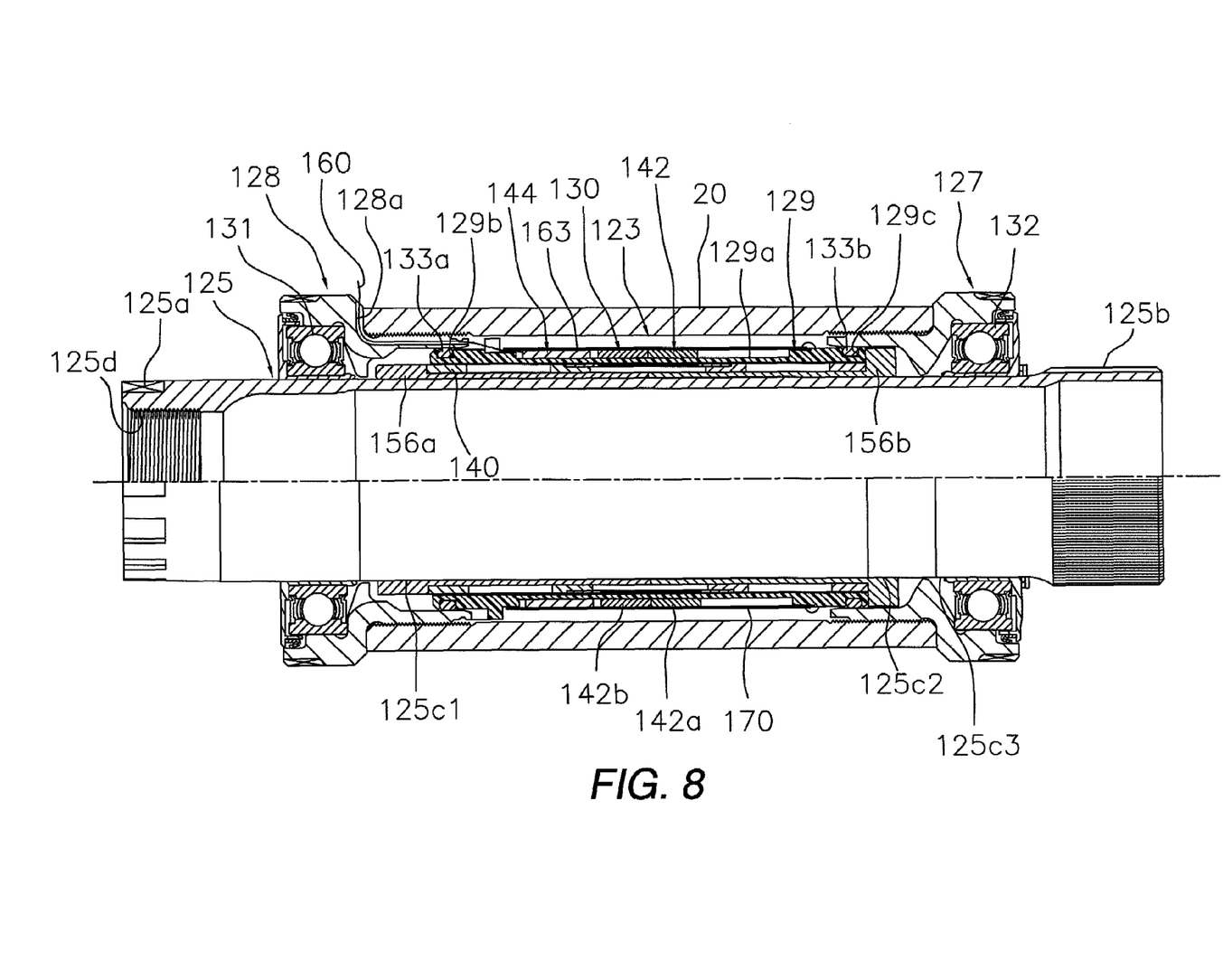
FIG. 8 is an enlarged cross-sectional view, similar to FIG. 3, of the crank axle assembly with the torque sensor in accordance with the second embodiment.

The crank shaft assembly 123 has a first adapter 127 threaded in from the right end of the hanger part 20, a second adapter 128 threaded in from the left end and a torque sensor 130 (an example of a torque-detecting device), as shown in FIG. 8. The crank axle 125 is rotatably supported on the first and second adapters 127 and 128. The torque sensor 130 is configured and arranged for detecting torque that acts on the crank axle 125. A cylindrical mounting member 129 made of a synthetic resin, for example, is mounted between the first adapter 127 and the second adapter 128.

The first and second adapters 127 and 128 are ridged cylindrical members threaded that are fastened separately from both ends of the hanger part 20 as previously described. A wire insertion groove 128a is formed in the axial direction of the external peripheral surface of a threaded portion of the second adapter 128 for leading a signal wire 160 (described later) to the outside of the second adapter 128.

The first and second adapters 127 and 128 and the crank axle 125 have a pair of bearings 132 and 131 disposed therebetween. The bearings 132 and 131 are in the form of ball bearings, that are disposed at axially spaced apart intervals between the first and second adapters 127 and 128 and the crank axle 125.

Figure 10:
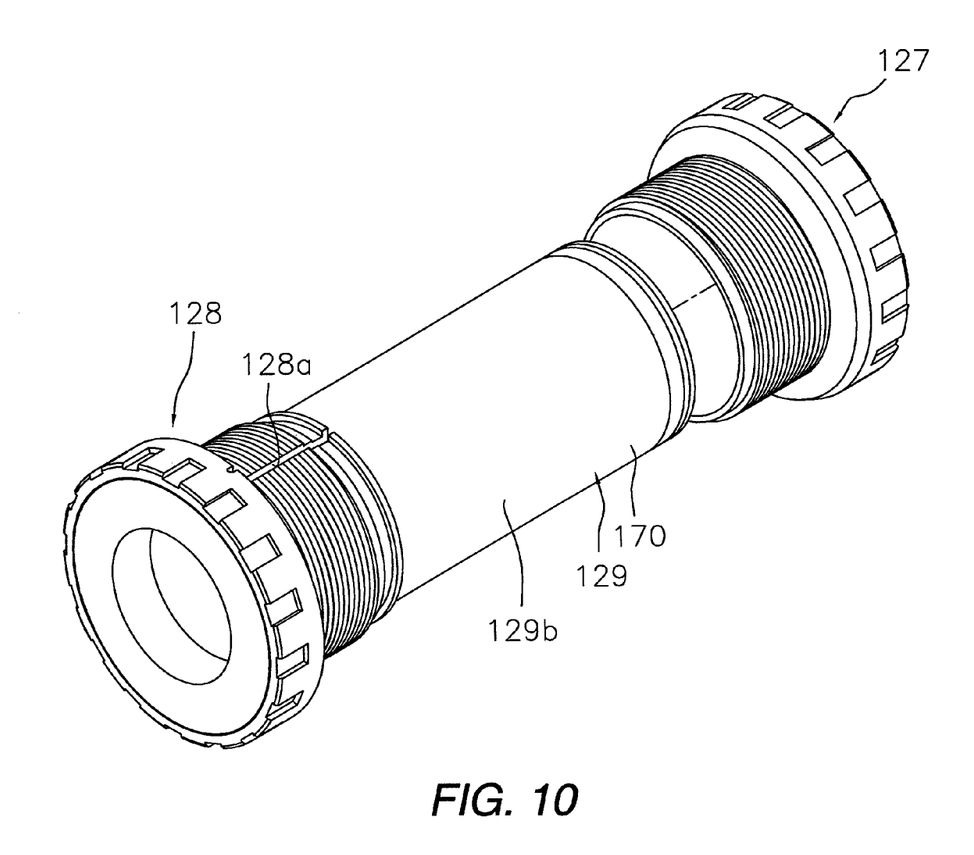
FIG. 10 is a perspective view of the first and second adapters used in the second embodiment.

The mounting member 129 interlocks with the internal peripheral surfaces of the first and second adapters 127 and 128 at the axially inside ends. The mounting member 129 is bonded to the second adapter 128 after mounting a torsion signal detector 142 (described later) and a rotational torque output unit 144, for example, as shown in FIG. 10. A cylindrical mounting concavity 129a is formed in the external peripheral surface in the middle of the mounting member 129. Circular grooves 129b and 129c in which O rings 133a and 133b are mounted are disposed in the external peripheral surface that faces the internal peripheral surface of the first and second adapters 127 and 128 at both ends of the mounting member 129. These O rings 133a and 133b make it possible to prevent grease and other such contaminants from infiltrating the interior of the mounting member 129. The elasticity of the O rings 133b and 133a can support the mounting member 129 on the first and second adapters 127 and 128. The external periphery of the mounting member 129 is covered by a cover member 170 in order to protect the devices mounted in the interior.

The crank axle 125 is a hollow cylindrical member that is rotatably mounted on the hanger part 20 via the bearings 131 and 132 and the first and second adapters 127 and 128. The crank axle 125 has a crank mounting part 125a with a tapered surface formed in the external peripheral surface at the left end of the crank axle 125. The left crank 126 is integrally and rotatably mounted on the crank mounting part 125a. The right end of the crank axle 125 has a large-diameter serration part 125b that is press-fitted into the mounting hole 139a of the gear crank 124 to allow the gear crank 124 to be fastened by crimping. Thus, the right end of the crank axle 125 is fixedly and rigidly coupled to the gear crank 124 so that they rotate together as an integrated unit.

Figure 9:
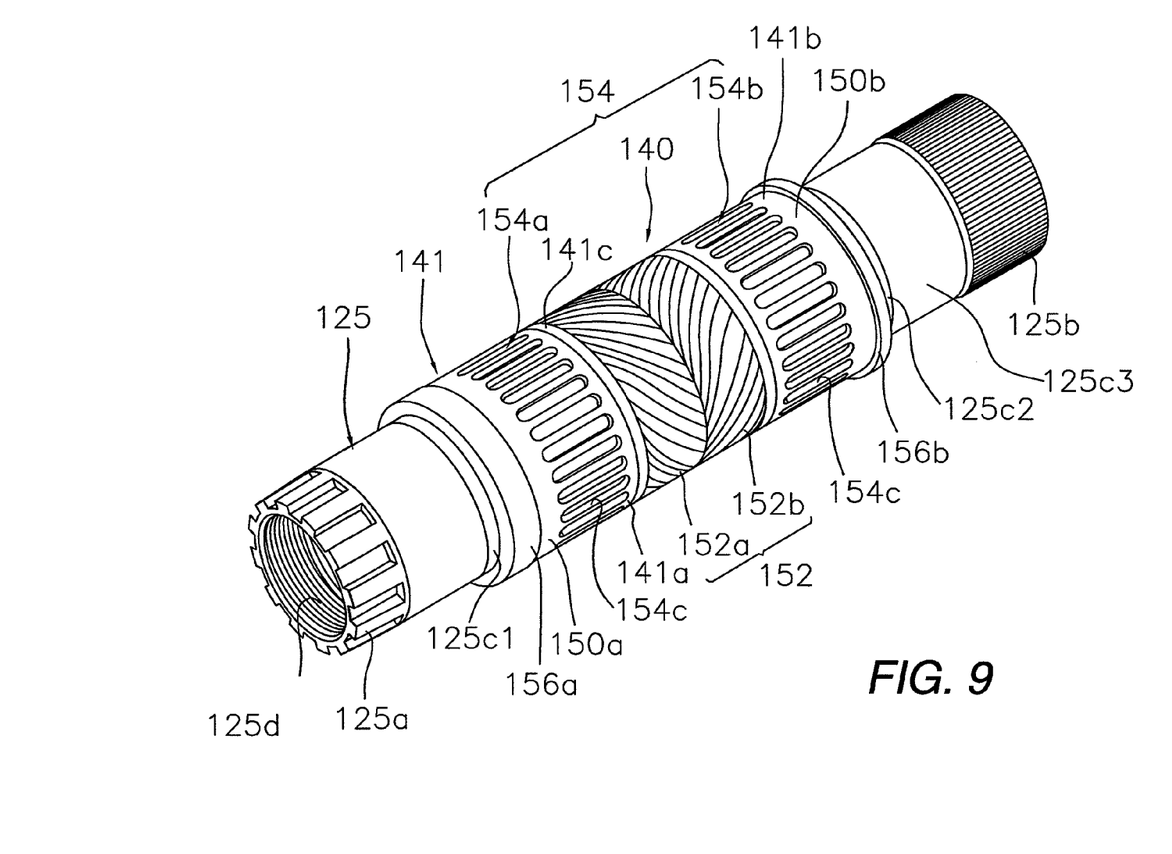
FIG. 9 is a perspective view, similar to FIG. 4, of a crank axle to which the sleeve member is fastened in accordance with the second embodiment.

As seen in FIGS. 8 and 9, the external peripheral surface of the crank axle 125 is provided with two press-fitting surfaces 125c1 and 125c2 that form a slight stepped arrangement. The press-fitting surfaces 125c1 and 125c2 have outer diameter with the outer diameter of the press-fitting surface 125c2 increasing slightly relative to the outer diameter of the press-fitting surface 125c1. The external peripheral surface of the crank axle 125 is also provided with a bearing-mounting surface 125c3 that is slightly larger in outer diameter than the maximum outer diameter of the press-fitting surface 125c2. Furthermore, a thread hole 125d is formed in the left end surface. The thread hole 125d threadedly receives the fastening bolt 164.

The torque sensor 130 comprises a sleeve member 140 attached to the crank axle 125 to detect torsion, a torsion signal detector 142, and a rotational torque output unit 144, as shown in FIG. 8.

The sleeve member 140 has a configuration that is identical to the sleeve member 40 of the first embodiment. The sleeve member 140 has a cylindrical sleeve main body 141 configured from first and second cylindrical members 141a and 141b made of, e.g., a comparatively rigid metal such as SK5 or any other suitable carbon tool steel; and a third cylindrical member 141c made of, e.g., SUS 304 or any other suitable nonmagnetic metal and disposed between the first and second cylindrical members 141a and 141b, as shown in FIG. 9. Therefore, in the following description, the details of the rest of the configuration of the sleeve member 140 and the operational effects thereof are not described. Components similar to those in the first embodiment are denoted by numerical symbols added to 100.

The sleeve member 140 also includes first and second torque-acting parts 150a and 150b, a torsion signal generator 152 and a torsion converter 154. The first and second cylindrical torque-acting parts 150a and 150b are disposed at two axially spaced apart locations. The torsion signal generator 152 is provided to at least part of the external peripheral surface between the first and second cylindrical torque-acting parts 150a and 150b. The torsion converter 154 is provided between the first and second cylindrical torque-acting parts 150a and 150b. The torsion signal generator 152 is configured and arranged for converting the torsion transmitted from the first and second cylindrical torque-acting parts 150a and 150b to the torsion signal generator 152.

The first and second cylindrical torque-acting parts 150a and 150b and the torsion converter 154 are disposed respectively on the first and second cylindrical members 141a and 141b in the second embodiment as well, and the torsion signal generator 152 is disposed on the third cylindrical member 141c.

The first and second cylindrical torque-acting parts 150a and 150b are provided separately to the ends of the sleeve member 140, i.e., to two locations at the axially outward ends of the first and second cylindrical members 141a and 141b. The first and second cylindrical torque-acting parts 150a and 150b are fastened separately to first and second press-fitted members 156a and 156b, which are fastened to the crank axle 125 by being press fitted from both end sides. The outer diameter of the ridge 157a of the first press-fitted member 156a on the left side is less than the inside diameter of the mounting member 129, but the outer diameter of the ridge 157b of the second press-fitted member 156b on the right side is greater than the inside diameter of the mounting member 129. The distal end of the mounting member 129 thereby comes into contact with the ridge 157b of the second press-fitted member 156b to enable the second adapter 128 to be easily positioned when the second adapter 128 to which the mounting member 129 is bonded is threaded onto the hanger part 20.

The torsion signal generator 152 has a plurality (e.g. two) of belt-shaped magnetostrictive members 152a and 152b bonded or otherwise suitably affixed to the external peripheral surface of the third cylindrical member 141c. The magnetostrictive members 152a and 152b have separate easy magnetization axes 152c and 152d. The magnetostrictive members 152a and 152b have magnetostrictive effects wherein the magnetic force greatly varies according to the strain caused by torsion. The easy magnetization axes 152c and 152d are made of, e.g., amorphous magnetic metallic foil, and that cross at an angle of, e.g., 90 degrees.

The torsion converter 154 has first and second torsion converter parts 154a and 154b bonded to the ends of the torsion signal generator 152 in the first and second cylindrical members 141a and 141b. The first and second torsion converter parts 154a and 154b both have a plurality of through-holes 154c provided at intervals around the circumference. These through-holes 154c are oval holes extending in the axial direction of the first and second cylindrical members 141a and 141b in the second embodiment as well.

In the second embodiment, the first and second press-fitted members 156a and 156b are press-fitted separately into the press-fitting surfaces 125c1 and 125c2 of the crank axle 125, and the ends of the sleeve member 140 are affixed separately to the first and second press-fitted members 156a and 156b via adhesion.

The torsion signal detector 142 has a configuration that is substantially similar to the torsion signal detector 42 of the first embodiment as shown in FIG. 8. The torsion signal detector 142 is disposed around the torsion signal generator 152 of the sleeve member 140, and detects torsion signals. The torsion signal detector 142 is fastened in the mounting concavity 129a of the mounting member 129. The torsion signal detector 142 is configured from, e.g., a pair of coils 142a and 142b for separately detecting the magnetic strain of the magnetostrictive members 152a and 152b. The torsion signal detector 142 detects torsion signals corresponding to the torque from impedance variation or induced voltage variation in the coils 142a and 142b along with permeability variation in the magnetostrictive members 152a and 152b caused by torsion.

The rotational torque output unit 144 calculates and outputs rotational torque applied to the crank axle 125 on the basis of the torsion signal detected by the torsion signal detector 142. The rotational torque output unit 144 is disposed on the left side of the torsion signal detector 142 in FIG. 8. The rotational torque output unit 144 is configured from an output circuit 163 having a cylindrical circuit board. The output circuit 163 has a configuration similar to the first embodiment, wherein the signal wire 160 is connected to the output terminal of the differential amplifier. The signal wire 160 is led to the outside of the hanger part 20 via the wire insertion groove 128a provided in the second adapter 128.

In the torque sensor 130 configured in this manner, when the crank axle 125 twists, torsion is created between the first and second cylindrical torque-acting parts 150a and 150b via the first and second press-fitted members 156a and 156b, similar to the first embodiment. The resulting torsion decreases and the reduced torsion is transmitted to both ends of the torsion signal generator 152, because the rigidity of the first and second torsion converter parts 154a and 154b is low. Strain is thereupon created in the two magnetostrictive members 152a and 152b. This strain causes the differential amplifier to output a DC voltage torque signal. The outputted torque signal is inputted via the signal wire 160 to, e.g., a gear shifting control device or another such external device provided to the exterior of the hanger part 20.

In the torque sensor 130 configured in this manner, since a torsion converter 154 is provided between the torsion signal generator 152 and the first and second cylindrical torque-acting parts 150a and 150b of the sleeve member 140, the torsion converter 154 can vary the torsion of the sleeve member 140 even when torque acts on the first and second cylindrical torque-acting parts 150a and 150b. Therefore, the range of torque detection can be varied in relation to the applied torque.

Less torsion is transmitted from the first and second cylindrical torque-acting parts 150a and 150b to the torsion signal generator 152. Therefore, the torsion signal generator 152 is not likely to twist excessively, and errors in measurement can be prevented even when a large amount of torque is applied.

Other Embodiments

In the previous embodiments, two (first and second) torque-acting parts were disclosed as torque-acting parts, but any number of torque-acting parts can be used as long as there is more than one.

In the previous embodiments, two (first and second) torsion converters were provided, but the torsion converter can also be provided between the torsion signal generator and at least one of the first and second cylindrical torque-acting parts. Therefore one torsion converter is acceptable.

In the previous embodiments, the torsion converter was configured from oval through-holes in order to reduce rigidity, but the configuration of the torsion converter is not limited to oval through-holes, and other possibilities include concavities that do not pass through, or varying the thickness of the sleeve member. The material of the torsion-converting portion may also be varied.

In the previous embodiments, the torsion transmitted from the first and second cylindrical torque-acting parts was converted by the torsion converter so as to be reduced, but the torsion may also be converted to as to be increased. For example, obstructing members that block off the oval holes can be provided to the torsion converter to increase torsional rigidity and the torsion in the torsion signal generator. The number of obstructing members can also be varied to vary the torsional rigidity.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cylindrical torsion-detecting sleeve member comprising:
    a first cylindrical torque-acting part disposed at a first location;
    a second cylindrical torque-acting part disposed at a second location that is axially spaced from the first location;
    a torsion signal generator disposed axially between the first and second cylindrical torque-acting parts to at least partially form an external peripheral surface between the first and second cylindrical torque-acting parts; and
    a torsion converter torsionally connected to and disposed between the torsion signal generator and at least one of the first and second cylindrical torque-acting parts for converting torsion transmitted from the at least one of the first and second cylindrical torque-acting parts through the torsion converter and subsequently to the torsion signal generator.

2. The torsion-detecting sleeve member according to claim 1, wherein
    the torsion converter is operatively arranged to reduce an amount of the torsion transmitted from the at least one of the first and second cylindrical torque-acting parts to the torsion signal generator.

3. The torsion-detecting sleeve member according to claim 1, wherein
    the torsion converter includes first and second torsion converter parts bonded to both ends of the torsion signal generator.

4. A cylindrical torsion-detecting sleeve member comprising:
    a first cylindrical torque-acting part disposed at a first location;
    a second cylindrical torque-acting part disposed at a second location that is axially spaced from the first location;
    a torsion signal generator disposed axially between the first and second cylindrical torque-acting parts to at least partially form an external peripheral surface between the first and second cylindrical torque-acting parts; and
    a torsion converter torsionally connected between the torsion signal generator and at least one of the first and second cylindrical torque-acting parts for converting torsion transmitted from the at least one of the first and second cylindrical torque-acting parts through the torsion converter and subsequently to the torsion signal generator, the torsion converter including a plurality of through-holes arranged in a circumferential direction.

5. The torsion-detecting sleeve member according to claim 4, wherein
    the through-holes are oval holes extending in an axial direction.

6. A cylindrical torsion-detecting sleeve member comprising:
    a first cylindrical torque-acting part disposed at a first location;
    a second cylindrical torque-acting part disposed at a second location that is axially spaced from the first location;
    a torsion signal generator disposed axially between the first and second cylindrical torque-acting parts to at least partially form an external peripheral surface between the first and second cylindrical torciue-acting parts, the torsion signal generator including a plurality of belt-shaped magnetostrictive members having intersecting easy magnetization axes; and
    a torsion converter torsionally connected between the torsion signal generator and at least one of the first and second cylindrical torque-acting parts for converting torsion transmitted from the at least one of the first and second cylindrical torque-acting parts through the torsion converter and subsequently to the torsion signal generator.

7. A torque-detecting device comprising
    a torque transmission shaft passing through and affixed to a cylindrical torsion-detecting sleeve member at first and second cylindrical torque-acting parts for transmitting rotational torque from the torque transmission shaft to the cylindrical torsion-detecting sleeve member, the torque transmission shaft being a single continuous member between the first and second cylindrical torque-acting parts,
    the cylindrical torsion-detecting sleeve member comprising
        the first cylindrical torque-acting part fixed at a first location;
        the second cylindrical torque-acting part fixed at a second location that is axially spaced from the first location;
        a torsion signal generator disposed axially between the first and second cylindrical torque-acting parts to at least partially form an external peripheral surface between the first and second cylindrical toriue-acting parts; and a torsion converter torsionally connected between the torsion signal generator and at least one of the first and second cylindrical torque-acting parts for converting torsion transmitted from the at least one of the first and second cylindrical torque-acting parts to the torsion signal generator;

a torsion signal detector disposed on an exterior of the torsion signal generator of the torsion-detecting sleeve member for detecting torsion signals from the torsion signal generator; and a rotational torque output unit configured to calculate and output the rotational torque applied to the torque transmission shaft based on detection signals detected from the torsion signal detector.

8. The torque-detecting device according to claim 7, wherein the torque transmission shaft is a crank axle that is configured to be received inside a bottom bracket.

9. The torque-detecting device according to claim 8, wherein the first and second cylindrical torque-acting parts are press-fitted onto the crank axle.

10. The torque-detecting device according to claim 7, wherein the torsion signal generator includes a plurality of belt-shaped magnetostrictive members having intersecting easy magnetization axes; and the torsion signal detector is a coil arranged to detect magnetic strain in the magnetostrictive members.

11. The torsion-detecting sleeve member according to claim 6, further comprising a torsion signal detector disposed on an exterior of the torsion signal generator of the torsion-detecting sleeve member for detecting torsion signals from the torsion signal generator, the torsion signal detector being a coil arranged to detect magnetic strain in the magnetostrictive members.

12. The torsion-detecting sleeve member according to claim 11, further comprising a torque transmission shaft affixed to the torsion-detecting sleeve member at the first and second cylindrical torque-acting parts for transmitting rotational torque from the torque transmission shaft to the a torsion-detecting sleeve member; and a rotational torque output unit confignred to calculate and output the rotational torque applied to the torque transmission shaft based on detection signals detected from the torsion signal detector.

* * * * *